(12) United States Patent
Lefebre

(10) Patent No.: US 8,635,804 B1
(45) Date of Patent: Jan. 28, 2014

(54) GHOST HEAD FISHING LURE

(75) Inventor: David M. Lefebre, Union City, PA (US)

(73) Assignee: Tabu Tackle, LLC, Ingleside, IL (US)

( * ) Notice: Subject to any disclaimer, the term of this patent is extended or adjusted under 35 U.S.C. 154(b) by 273 days.

(21) Appl. No.: 13/317,313

(22) Filed: Oct. 14, 2011

(51) Int. Cl.
*A01K 85/00* (2006.01)

(52) U.S. Cl.
USPC .................... 43/42.39; 43/44.81; 43/42.35

(58) Field of Classification Search
USPC .............. 43/42.39, 44.81, 42.35, 42.1, 42.31, 43/42.24
See application file for complete search history.

(56) References Cited

U.S. PATENT DOCUMENTS

| | | | |
|---|---|---|---|
| 3,465,466 A | | 9/1969 | Showalter |
| 4,196,884 A | | 4/1980 | Zeman |
| 4,219,956 A | * | 9/1980 | Hedman ................... 43/42.1 |
| 4,771,567 A | | 9/1988 | Cannon |
| 4,819,366 A | * | 4/1989 | Manno .................... 43/44.81 |
| 4,843,754 A | | 7/1989 | Spelts |
| 4,887,377 A | | 12/1989 | Morris |
| 4,918,854 A | * | 4/1990 | Webre, Jr. .................. 43/42.31 |
| 4,976,060 A | | 12/1990 | Nienhuis |
| 5,070,639 A | | 12/1991 | Pippert |
| 5,203,106 A | * | 4/1993 | Huppert .................... 43/42.39 |
| 5,335,443 A | * | 8/1994 | Grigsby, Jr. ................ 43/44.81 |
| 5,564,220 A | | 10/1996 | Blicha |
| 5,678,350 A | | 10/1997 | Moore |
| 5,806,234 A | | 9/1998 | Nichols |
| 6,041,540 A | | 3/2000 | Potts |
| 6,266,916 B1 | | 7/2001 | Dugan |
| 6,393,757 B2 | | 5/2002 | Bomann |
| 7,036,266 B2 | * | 5/2006 | Falcon .................... 43/44.81 |
| 7,185,457 B2 | | 3/2007 | Nichols |
| 7,614,178 B2 | * | 11/2009 | Hoyt ...................... 43/42.31 |
| 7,827,731 B2 | | 11/2010 | Gibson |
| 2008/0250693 A1 | * | 10/2008 | Krueger ................... 43/42.39 |
| 2009/0211145 A1 | * | 8/2009 | Thorne .................... 43/42.39 |
| 2010/0313463 A1 | * | 12/2010 | Coxey .................... 43/42.39 |
| 2012/0272564 A1 | * | 11/2012 | Roberts et al. ............. 43/42.31 |

* cited by examiner

*Primary Examiner* — Christopher P Ellis
(74) *Attorney, Agent, or Firm* — Richard K Thomson

(57) ABSTRACT

A fishing jig includes a hook shank including i) a substantially straight portion extending along a first axis; ii) an angulated length forming a shoulder at a first upper end of the straight portion including a first section extending at an obtuse angle to the straight portion and a second section bent at a 45° away from the point, a place of intersection between the first section and the second section forming a crook in said angulated length; a malleable weight secured to the hook shank overlying the crook and iii) a line-tie eyelet formed at a terminal end of the second section. Molded soft plastic baits having pockets to receive the malleable weight are also a feature of the invention.

12 Claims, 3 Drawing Sheets

GHOST HEAD FISHING LURE

BACKGROUND AND SUMMARY OF THE INVENTION

The present invention is directed to the field of fishing. More particularly, the present invention is directed to a Ghost Head [trademark] jig head and fishing lure system which provides both weedless operation and features an attached weight that is embedded in a soft plastic bait.

Currently, there are no jig heads or weighted hook systems on the market which allow a lead-head to be hidden inside a solid body or hollow body bait, while also making the bait weedless (snag-resistant) without hindering the natural look and action of the bait while it is being fished. Furthermore, there is currently no adequate way to solidly anchor a rattle inside a hollow body bait.

The ghost head jig head of the present invention solves the problems associated with the prior art by providing a lead-head which can be hidden inside an existing soft plastic hollow body bait and permit a rattle to be anchored inside a hollow body bait. Whenever the term "plastic" is used in this specification, it will be understood it is intended to mean "soft plastic" as distinguished from the hard/rigid plastic lures that are currently available on the market. The jig of the present invention comprises a) a hook having a body including a hook point and a hook shank, the hook shank including i) a substantially straight portion having a first upper end, the substantially straight portion extending along a first axis; ii) an angulated length forming a shoulder at the first upper end of the straight portion, the angulated length including a first section extending at an obtuse angle to the straight portion and a second section bent at a 45° away from the point, a place of intersection between the first section and the second section forming a crook in the angulated length; iii) a line-tie eyelet formed at a terminal end of the second section; b) a malleable weight secured to the hook shank in the angulated length overlying the crook between the first section and the second section. Preferably, the obtuse angle is in the range of from 95° to 110°. The malleable weight is secured in place by casting or deforming the malleable weight to grasp the crook in the angulated length. Preferably, a docking port is formed in the malleable weight for receiving a protrusion of an attachment. Suitable existing attachments include a group consisting of a rattle and a chemical light stick.

A second feature of the present invention is a lure system using the jig head of the present invention. This feature comprises a hidden weighted hook which provides weedless operation and interchangeable soft plastic baits, the fishing lure system including a) a weighted hook including a hook with a body including a shank which has i) a straight portion having a first upper end, the straight portion extending along a first axis; ii) an angulated length forming a shoulder at said first upper end of said straight portion, said angulated length including a first section forming a first angle with said straight portion and a second section bent away from said hook point at a second angle, a place of intersection between said first section and said second section forming a crook in said angulated length; iii) an eyelet formed at a terminal end of the second section; iii) an eyelet formed at a terminal end of the angulated portion; b) a soft plastic bait configured to imitate a shape of a natural prey species or live bait. The natural prey species or live bait is selected from a group consisting of crawfish, leach, worm, salamander, frog, toad, fish, tadpole, snake, lizard, insect, crab and shrimp.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
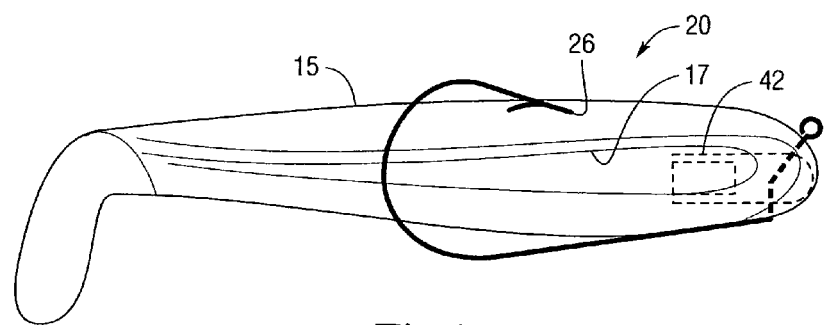
FIG. 1 is a side view of a first embodiment of the Ghost Head fishing jig of the present invention shown inside an existing hollow-body swim bait.
Figure 2:
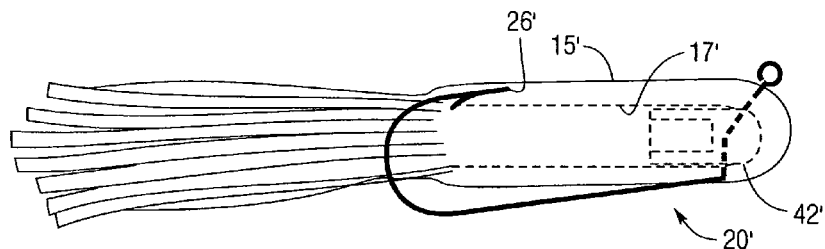
FIG. 2 is a side view of a second embodiment with an alternate hook point configuration shown inside an existing hollow-body tube bait.
Figure 4:
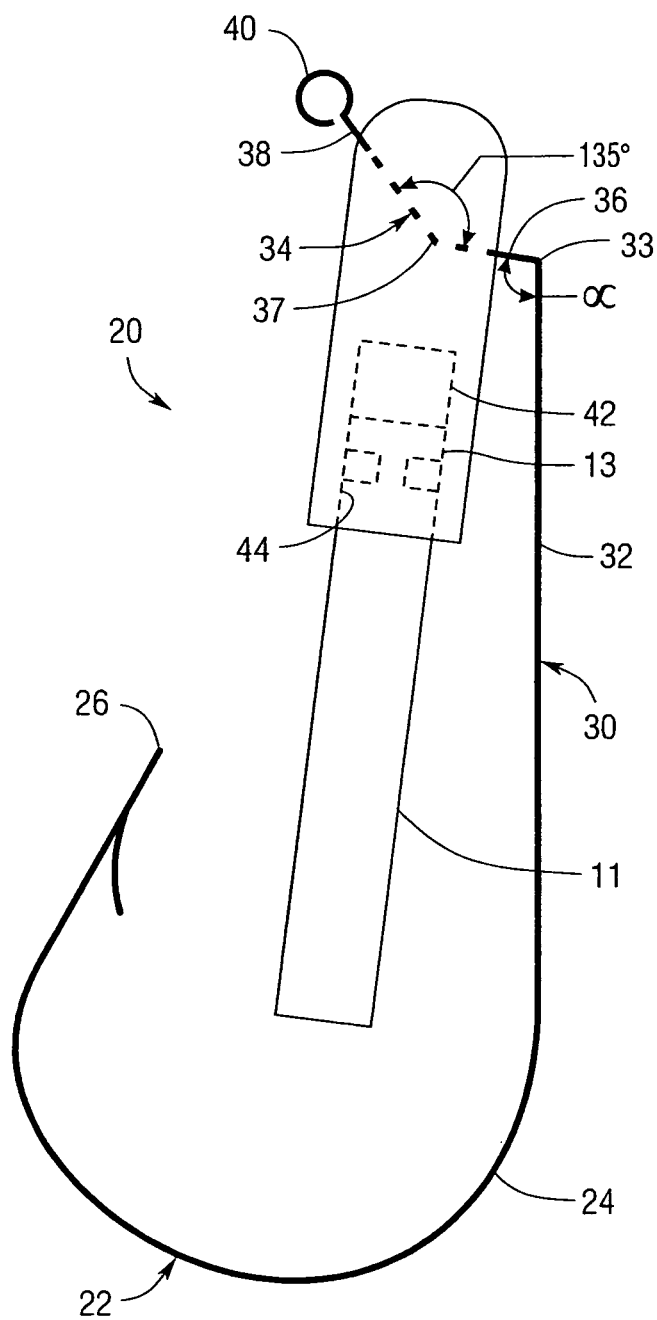
FIG. 4 is a side view of the first embodiment of fishing jig used with existing soft plastic hollow body bait and with specially molded lures in the fishing lure system of the present invention.

A first embodiment of the fishing jig head of the present invention is depicted in FIGS. 1, 2, and 4 generally at 20. As best seen in FIG. 4, jig head 20 comprises hook 22 which has a body 24 with a point 26 and a shank 30. Shank 30 includes a straight portion 32 lying along an axis A and an angulated length 34 which includes a first section 36 which extends at an obtuse angle α from upper end 33 of straight portion 32 and a second section 38 bent upwardly 45° away from point 26 (second section 38 forming an included angle of 135° with first section 36). Preferably, obtuse angle α falls in a range of between 95° and 110°. The intersection between first section 36 and second section 38 forms a crook 37 in angulated length 34. Line-tie eyelet 40 is formed at the end of second section 38. In this embodiment, hook point 26 extends toward crook 37, while in some of the other embodiments, point 26 extends directly toward eyelet 40. In all embodiments, hook point 26 extends toward eyelet 40 or inwardly thereof. Malleable weight 42, typically formed of lead, is secured spanning crook 37 to inhibit its tendency to move along angulated length 34. Weight 42 may be cast directly onto the crook 37 or pinched/squeezed thereon without departing from the scope of the invention. Weight 42 includes a docking port 44 which may receive a rattle or chemical light stick 11, which forms no part of the invention but, rather, may be acquired from existing retailers and outlets of fishing gear. While it is possible to design the docking port 44 to permit the attachments to snap in, these accessories are typically glued in place by placing a drop of ethyl cyanoacrylate on the protrusion 13 of attachment 11 and inserting it into the docking port 44.

As depicted in FIG. 1, the fishing jig head 20 of the present invention can be used with a plurality of existing hollow-body swim baits 15 which have a hollow core 17 which will accommodate malleable weight 42 and docking port 44. Similarly, in FIG. 2, a tube bait 15' also has a hollow core 17' which receives weight 42'. Hook point 26 is looped through swim bait 15, and then back into the opposite side for weedless operation. Alternatively, as seen in FIG. 2, hook point 26' can be rigged so as not to emerge from the body of the bait 15'.

Figure 3:
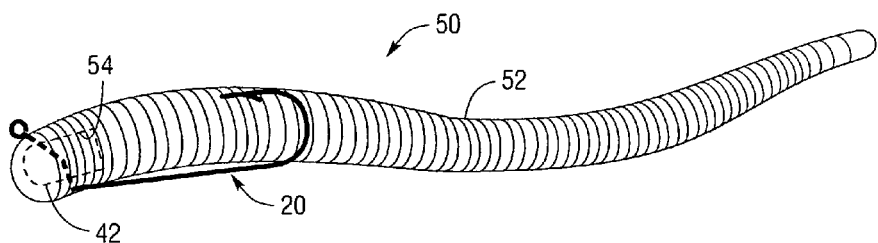
FIG. 3 is a side view of a third embodiment featuring a specifically molded lure for use with the jig head of the present invention.
Figure 5:
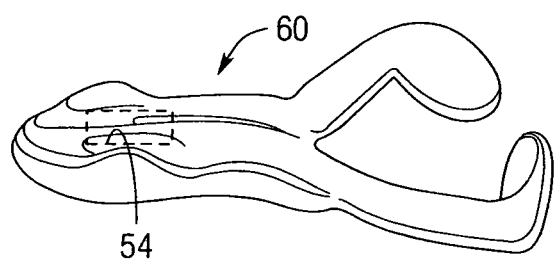
FIG. 5 is a side view of a specifically-molded soft plastic frog bait for use in the fishing lure system of the present invention; and, FIG. 6 is a top view of a specifically molded soft plastic crawfish bait for use in the fishing lure system of the present invention.
Figure 6:
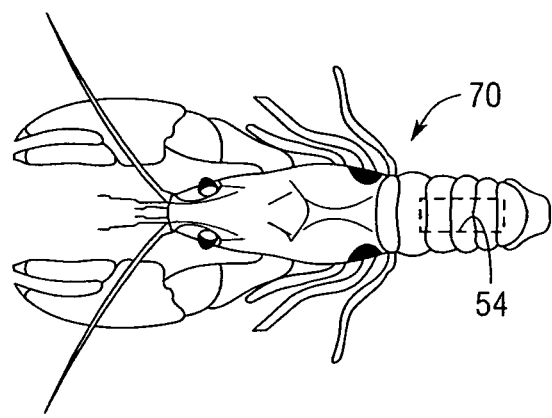

As depicted in FIG. 3, the fishing lure system 50 of the present invention will include specially molded lures 52 which include a pocket 54 which accommodates malleable weight 42 of jig head 20. These specially molded soft plastic baits manufactured for use with Applicant's jig head 20 will increase the number of lures with which jig head 20 can be used. FIGS. 5 and 6 depict a frog bait 60 and crawfish bait 70, respectively, specifically molded with a pocket 54 for use in conjunction with the jig head 20 of the present invention. FIGS. 2 and 3 depict the alternate hook point configuration mentioned supra, shown rigged for weedless operation with a tube bait and a worm, respectively. The weight 42 in FIG. 3 shown with this embodiment does not have a docking port, since the bait's profile does not allow use of attachments. It will be appreciated that the configuration of jig head 20 shown in FIGS. 1, 2 and 4 can be employed where the use with a rattle or chemical light stick is desired and the configuration of the molded bait permits.

The jig head 20 and fishing lure system 50 of the present invention provides for the first time a soft plastic lure in which the jig head and malleable weight can be completely embedded and the hook point rigged for weedless operation without detracting from the natural appearance of the lure.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A fishing jig head for providing a soft plastic hollow-body swim bait and other soft plastic hollow body baits hidden weighted hooks with weedless operation, said jig head comprising
    a) a hook having a body including a hook point and a hook shank said hook shank including
        i) a straight portion having a first upper end, said straight portion extending along a first axis;
        ii) an angulated length forming a shoulder at said first upper end of said straight portion, said angulated length including a first section extending at an obtuse angle to said straight portion and a second section bent at a 45° away from said point, a place of intersection between said first section and said second section forming a crook in said angulated length;
        iii) a line-tie eyelet formed at a terminal end of said second section;
    b) a malleable weight secured to said hook shank in said angulated length overlying said crook between said first section and said second section.

2. The jig head system of claim 1 wherein said obtuse angle is in the range of from 95° to 110°.

3. The jig head system of claim 1 wherein said malleable weight is secured in place by casting or deforming said malleable weight to grasp said crook in said angulated length.

4. The jig head of claim 1 further comprising a docking port in said malleable weight for receiving a protrusion of an attachment.

5. The jig head of claim 4 wherein said attachment is selected from a group consisting of a rattle and a chemical light stick.

6. A fishing lure system having a hidden weighted hook which provides weedless operation and interchangeable soft plastic baits, said fishing lure system comprising
    a) a weighted hook including a hook with a body including a hook point and a hook shank which has
        i) a straight portion having a first upper end, said straight portion extending along a first axis;
        ii) an angulated length forming a shoulder at said first upper end of said straight portion, said angulated length including a first section forming a first angle with said straight portion and a second section bent away from said hook point at a second angle, a place of intersection between said first section and said second section forming a crook in said angulated length;
        iii) a line-tie eyelet formed at a terminal end of said second section;
    b) a malleable weight secured to said hook shank in said angulated length overlying said crook between said first section and said second section
    c) a soft plastic lure configured to imitate a shape of a natural prey species overlying and masking a substantial portion of said weighted hook.

7. The fishing lure system of claim 6 wherein said natural prey species is selected from a group consisting of crawfish, leach, worm, salamander, frog, toad, fish, tadpole, snake, lizard, insect, crab and shrimp.

8. The fishing lure system of claim 7 wherein said shoulder portion further comprises a first length extending at an obtuse angle to said straight portion of said shank and said second length being bent at a 45° away from said hook point.

9. The fishing lure system of claim 8 wherein said obtuse angle is in the range of from 95° to 110°.

10. The fishing lure system of claim 9 further comprising a malleable weight secured in place by deforming said malleable weight to grasp said crook in said angulated length.

11. The fishing lure system of claim 6 wherein said soft plastic bait further comprises a molded hollow cavity for receiving said malleable weight.

12. The fishing lure system of claim 7 wherein said soft plastic lure masks an entirety of said weighted hook.

\* \* \* \* \*